United States Patent [19]

Smith

[11] Patent Number: 5,410,374
[45] Date of Patent: Apr. 25, 1995

[54] MEANS TO FLEXIBLY ATTACH LENS FRAMES TO TEMPLE MEMBERS

[75] Inventor: Harry D. Smith, Richland, Wash.

[73] Assignee: Battelle Memorial Institute, Richland, Wash.

[21] Appl. No.: 47,130

[22] Filed: Apr. 13, 1993

[51] Int. Cl.⁶ .................................................. G02C 5/22
[52] U.S. Cl. ..................................... 351/150; 351/140; 351/153
[58] Field of Search ................. 16/228; 351/63, 66, 351/111, 112, 113, 114, 115, 116, 121, 140, 142, 150, 151, 152, 153

[56] References Cited

U.S. PATENT DOCUMENTS

| | | | |
|---|---|---|---|
| 2,693,132 | 11/1954 | Belgard | 351/121 |
| 3,813,152 | 5/1974 | Hampel | 16/228 |
| 4,978,209 | 12/1990 | Ohba | 351/153 |
| 5,009,495 | 4/1991 | Williams | 16/228 |
| 5,059,017 | 10/1991 | Bennato | 16/228 |
| 5,146,649 | 9/1992 | Da Pra' | 16/228 |

FOREIGN PATENT DOCUMENTS

| | | | |
|---|---|---|---|
| 0426006 | 5/1991 | European Pat. Off. | 16/228 |
| 1009345 | 5/1952 | France | 351/153 |

*Primary Examiner*—William L. Sikes
*Assistant Examiner*—David R. Parsons
*Attorney, Agent, or Firm*—Johnnie R. Hynson

[57] ABSTRACT

The invention is a band hinge for flexibly connecting the temple member to the lens frame thereby preventing damage from inadvertent pressure or cyclic wear. A distinguishing feature of the invention is the use of a band hinge that holds together the temple member and the lens frame without the use of a pin or screw hinging mechanism. The invention allows for a high degree of freedom of movement for the temple member with respect to the lens frame which will prevent most forms of damages to the glasses from these types of events.

1 Claim, 10 Drawing Sheets

MEANS TO FLEXIBLY ATTACH LENS FRAMES TO TEMPLE MEMBERS

FIELD OF THE INVENTION

The present invention relates generally to a hinge for an eyeglass frame, and more specifically to a band hinge for connecting the lens frame to the temple member.

BACKGROUND OF THE INVENTION

Eyeglasses are frequently damaged by inadvertent pressure being applied to the temple member relative to the lens frame as, for example, when the temple members are opened and when weight is applied to the eyeglasses. Another reason for failure of an eyeglass hinge is the plastic deformation of the temple member, lens frame, and hinge from the fatigue of the cyclic stress experienced in the putting on and removing of the eyeglasses over a period of time.

Another mode of eyeglass hinge failure is the loss or loosening of small screws, serving as hinge pins, which tend to come loose and are easily lost. These small parts often require specially designed tools to effect repairs. When the screws become loose, or the parts become plastically deformed, the temple member can open beyond its designed position thereby reducing or losing its function of applying lateral inward pressure to the wearer, and therefore losing its ability to hold the eyeglasses securely to the wearer's head.

SUMMARY OF THE INVENTION

The invention is a band hinge for flexibly connecting the temple member to the lens frame thereby preventing damage from inadvertent pressure or cyclic wear.

The invention allows for greater freedom of movement of the temple member with respect to the lens frame which will prevent most forms of damage to the eyeglass hinge.

A distinguishing feature of the invention is the use of a band hinge that connects together the temple member and the lens frame without the use of a pin or screw hinging mechanism. When a band is attached to the forward end of the temple member and to the upper corner of the lens frame connected in that manner, the band applies force to hold the temple member firmly in place and simultaneously against the lens frame and the side of the wearer's head.

Many repairs to eyeglasses are for the purpose of correcting hinge damage. The invention will eliminate most of these repairs and in addition offers the following advantages: gives greater flexibility, maintains alignment of the temple member relative to the lens frame, holds the eyeglasses firmly in place, has fewer hinge parts, is a simple design, eliminates the need for pins or screws, and permits use of a variety of various types of readily available band materials. An additional advantage is that no special small tools are required for maintenance or manufacture.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3c is an enlarged top cross sectional view of a portion of FIG. 3a;

DESCRIPTION OF THE PREFERRED EMBODIMENTS

Figure 1:
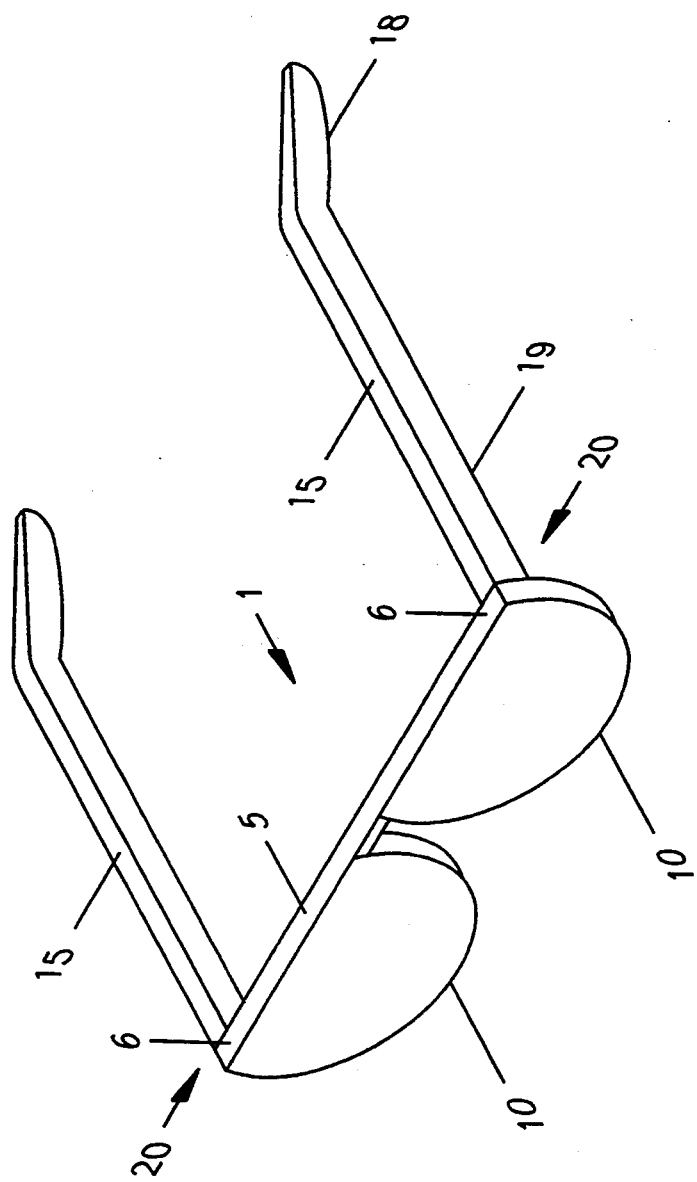
FIG. 1 is an isometric view of conventional eyeglasses to which the invention is applied.

FIG. 1 illustrates a typical pair of eyeglasses 1 on which the invention can be used. Eyeglasses 1 generally comprise a lens frame 5 which holds lenses 10. To the lens frame 5 at upper corners 6 will be attached a pair of temple members 15. While attachment of the temple members 15 to the upper corners 6 is preferred, it is also contemplated that the temple members 15 could be attached at other positions on the lens frame 5. The invention is a hinge device 20 that interconnects the lens frame 5 and the temple member 15. The temple member has both a forward or attaching end 19 that is adjacent to and attached to the upper corner 6 of the lens frame 5, and a free end 18 that extends transversely from the attaching end 19 which generally fits behind the ear of the wearer.

Figure 2A:
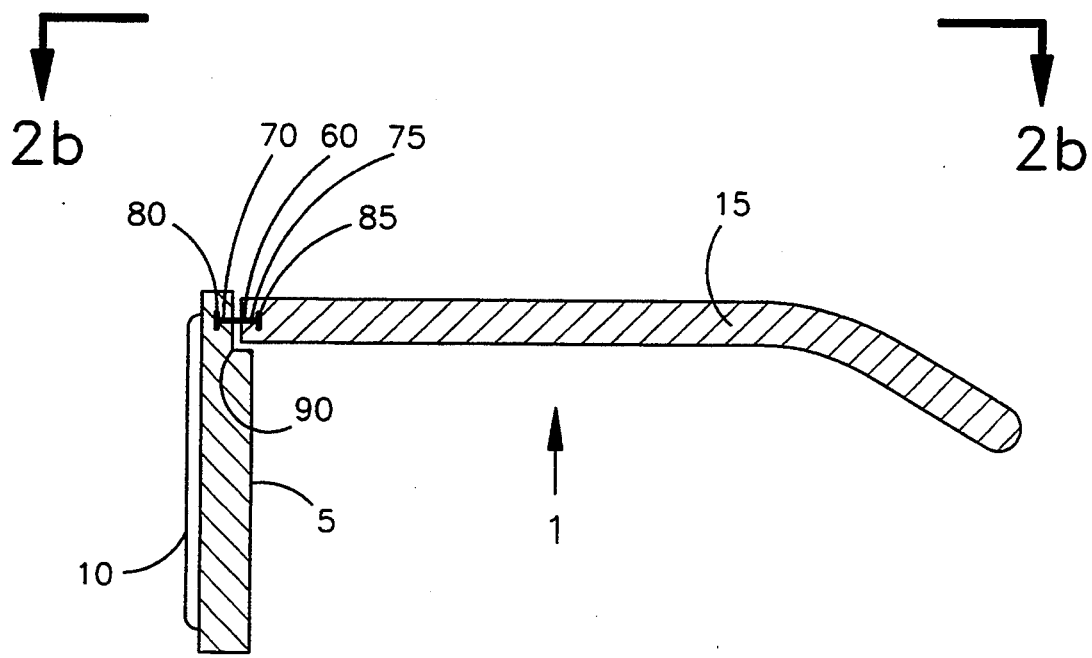
FIG. 2a is a cross sectional view along lines 2a—2a illustrating a first preferred embodiment of the band hinge connecting the lens frame and the temple member.
Figure 2B:
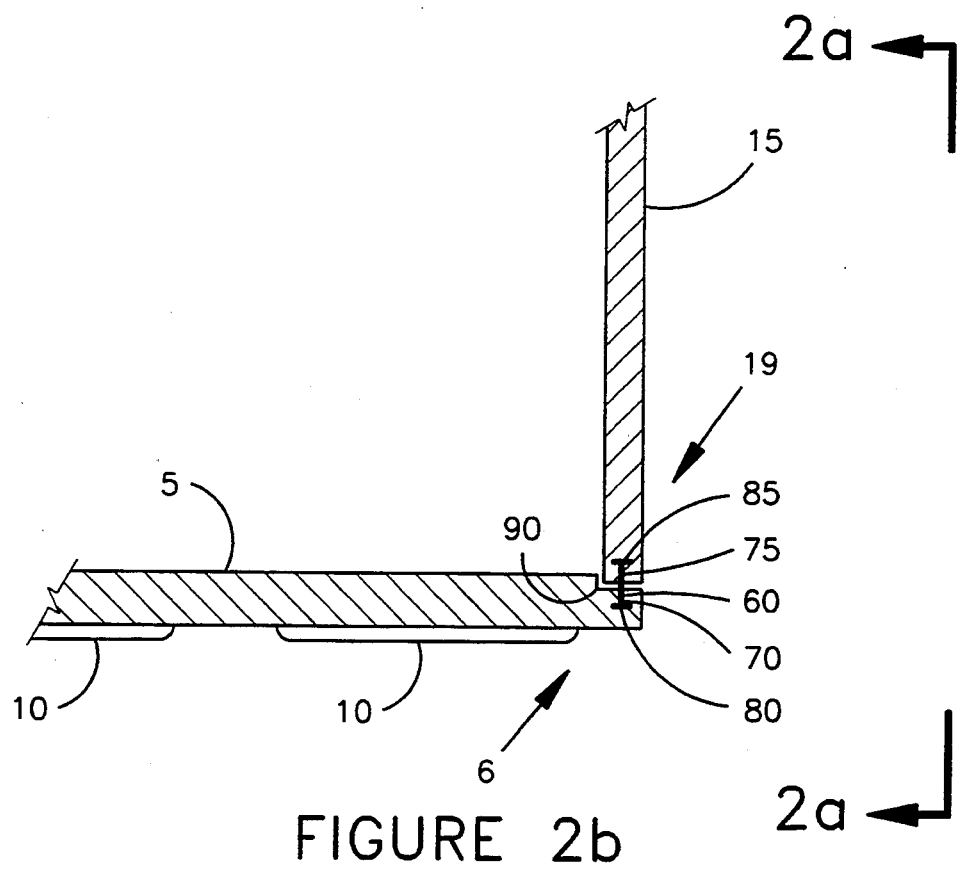
FIG. 2b is a partial cross sectional view along lines 2b—2b illustrating a first preferred embodiment of the band hinge connecting the lens frame and the temple member.
Figure 2C:
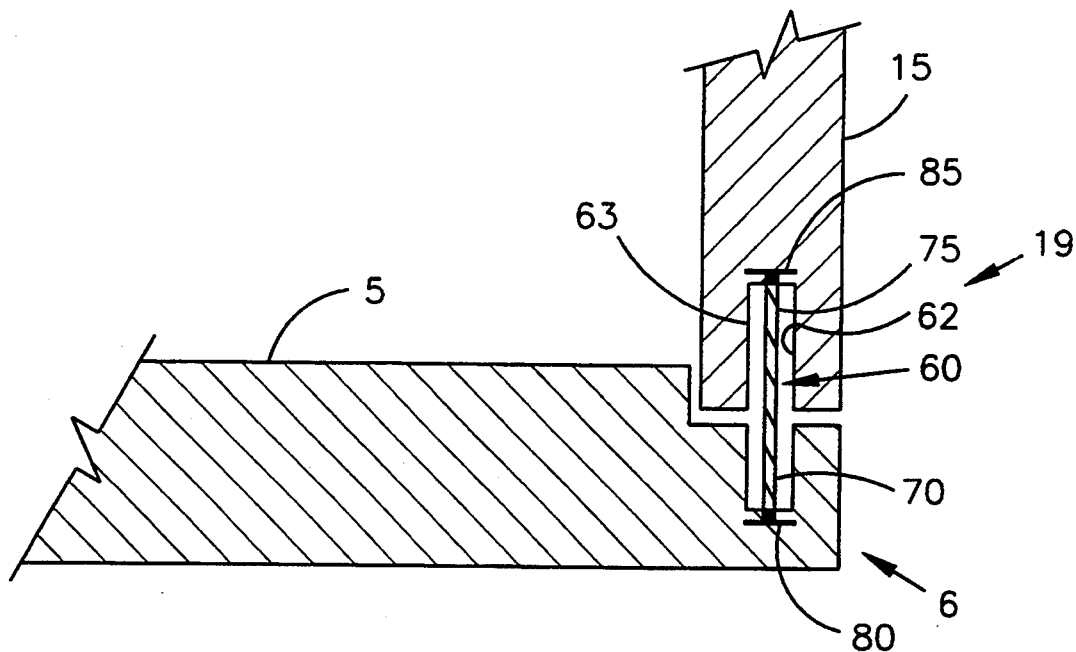
FIG. 2c is an enlarged top view of a portion of FIG. 2b.
Figure 2D:
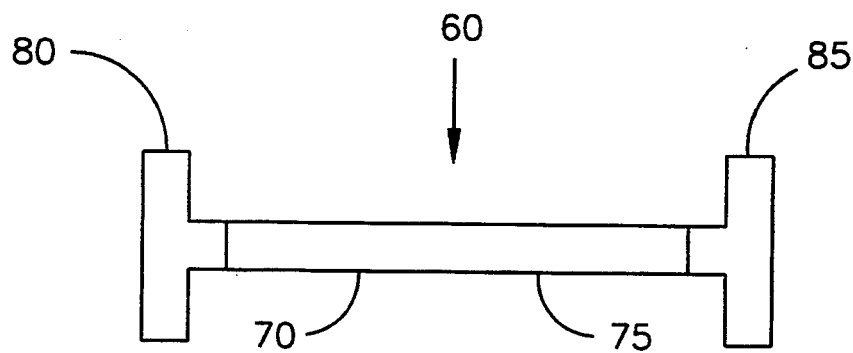
FIG. 2d is a schematic representation of the band hinge showing a preferred attachment means.

A first preferred embodiment of the invention is the configuration illustrated in FIGS. 2, 2a, 2b, and A band hinge 60 flexibly secures the attaching end 19 of temple member 15 to the upper corner 6 of the lens frame 5. The band hinge 60 has a first hinge portion 75 and a second hinge portion 70 which are drawn toward each other by the tension force of the band hinge 60. The first hinge portion 75 is attached to the temple member 15 by an attaching means 85, and the second hinge portion 70 is attached to the lens frame 5 by an attaching means 80. FIG. 2d illustrates the preferred embodiment of attaching means 80 and 85 which are embedded in the material of construction of the temple member 15 and the lens frame 5. Attaching means 80 and 85 can include, but are not limited to, glue, heat bonding, pins, or a screw attachment end.

The most efficient means of allowing for the maximum flexibility of the band hinge 60 is for it to have freedom of movement relative to the temple member 15 and the lens frame 5. This is accomplished by means of a band chamber 63 provided in the lens frame 5 and the temple member 15. The clearance distance between the band hinge 60 and the interior wall 62 of the band chamber 63 is not critical, but must be sufficient to allow for movement between the band hinge 60 and the inner surface 62 of the band chamber 63.

The band hinge 60 includes but is not limited to, two bands in parallel, two bands in series, a single band of varying width, a conventional circular rubber band, or a band having variations of material composition of the band. Example of materials of construction would include, but not be limited to: rubber, polymer, metal, spring wire, or composite materials. This embodiment, as illustrated in FIG. 2a through 2d, uses a single band hinge 60 which is a piece of material, that will apply a force, when elongated, which will cause the temple member 15 to be pulled toward the lens frame 5. An optional feature of this embodiment is the use of a receptacle groove 90 in the lens frame 5 for receiving the attaching end 19 of the temple member 15.

Figure 3A:
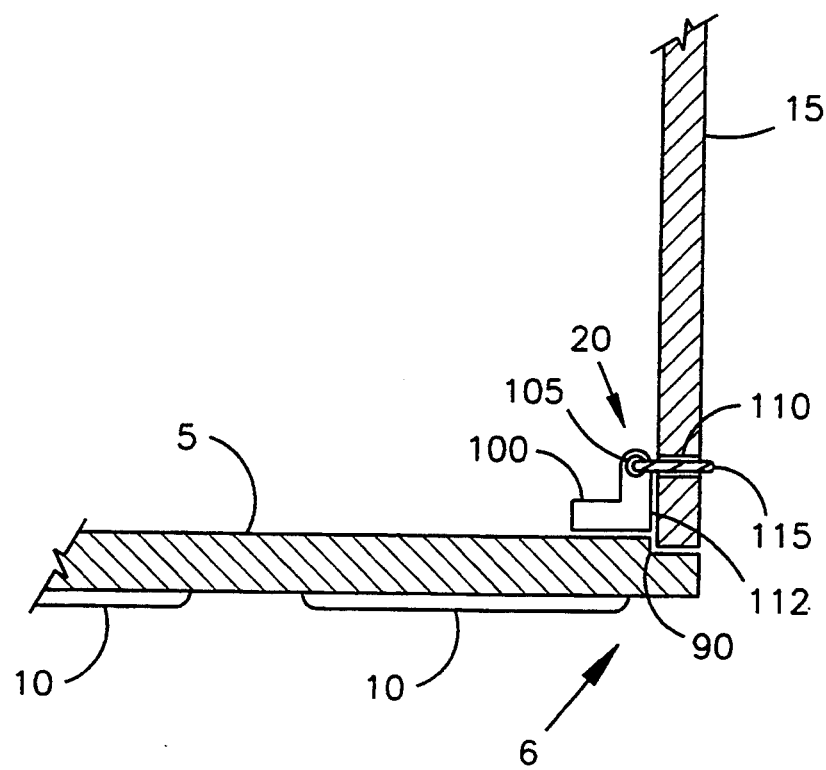
FIG. 3a is a partial cross sectional view from above along lines 3a—3a illustrating the invention.
Figure 3B:
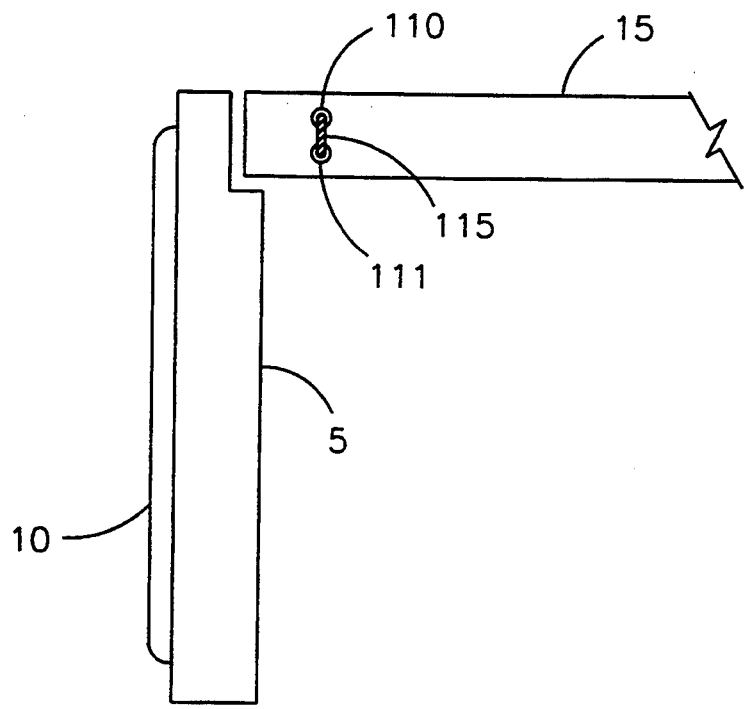
FIG. 3b is an enlarged side view of a portion of FIG. 3.
Figure 3C:
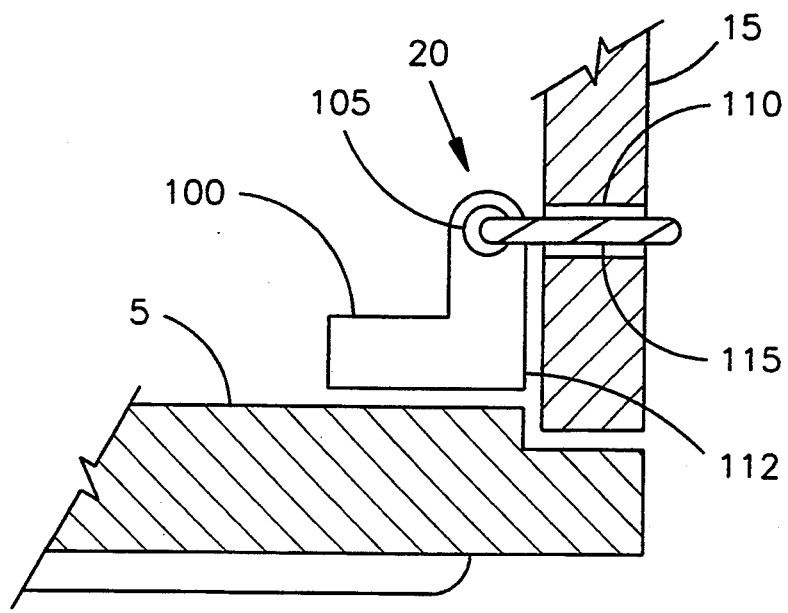
Figure 3D:
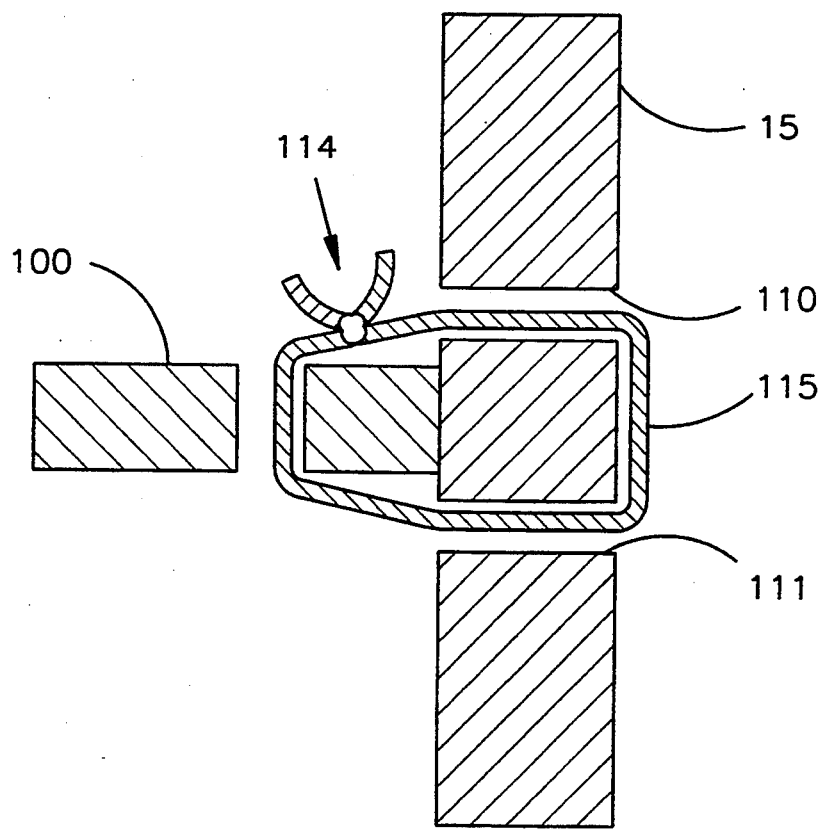
FIG. 3d is an enlarged cross sectional side view of a portion of FIG. 3d.
Figure 3E:
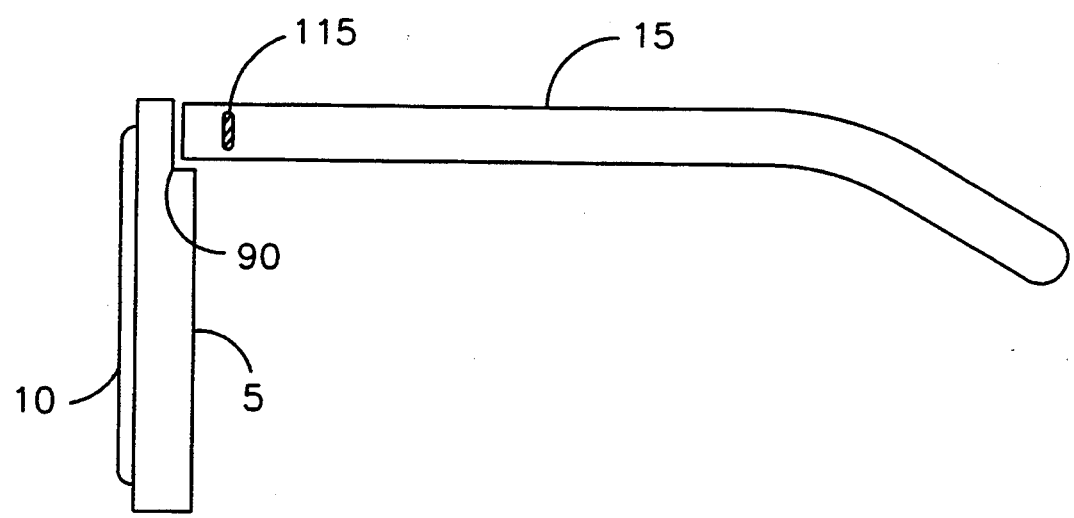
FIG. 3e is a side view illustrating the location of the band in use with a conventional pair of eyeglasses.

A second preferred embodiment is illustrated in FIGS. 3a through 3e wherein the invention is adapted to a conventional pair of eyeglasses 1 having a conventional hinge device 20. A first hinge pin bracket 100 well known to those skilled in this art is affixed to the lens frame 5 and holds the temple member 15 to the lens frame 5. The first hinge pin bracket 100 typically defines an aperture 105. The aperture 105 can be with or without threads. A second hinge bracket (not shown) typically is attached to the attaching end 19 of the temple member 15 is removed. Guide holes 110 and 111 for the band 115 are drilled or otherwise provided through the temple member 15 and receive the band 115 as illustrated in FIG. 3b. The band 115 is threaded through the guide holes 110 and and then through the threaded aperture 105 and the ends of the band are connected 114 thereby forming a circular spring similar to a common rubber band. The tension force in the band 115 holds the temple members 15 against the leading edge 112 of the first hinge pin bracket 100 and the lens frame 5. This allows for freedom of motion of the temple member 15 relative to the lens frame 5.

Figure 4A:
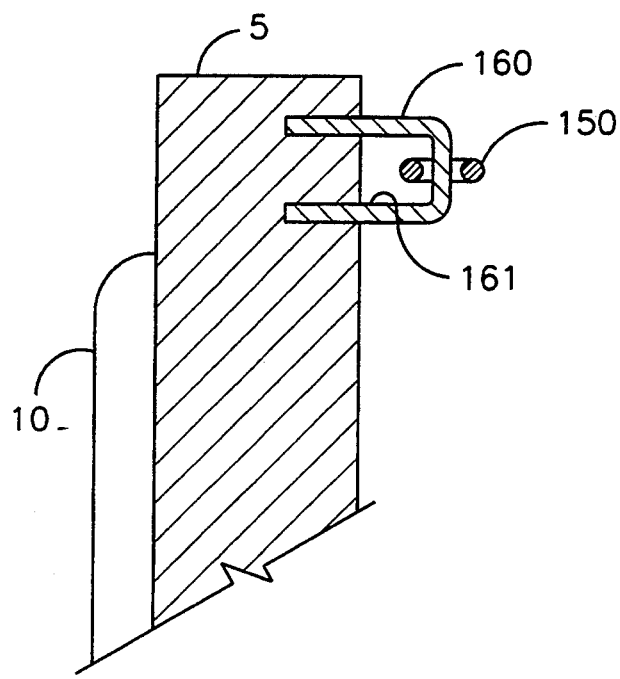
FIG. 4a is a partial side cross sectional view along lines 4a—4a illustrating the location of the "j" shaped temple member spring band attachment, and the "U" shaped lens frame band attachment.
Figure 4B:
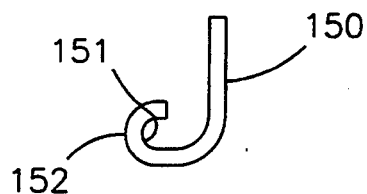
FIG. 4b is a schematic representation of a "j" shaped temple member spring band.
Figure 4C:
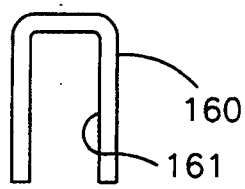
FIG. 4c is a schematic representation of an "U" shaped lens frame band attachment.
Figure 4D:
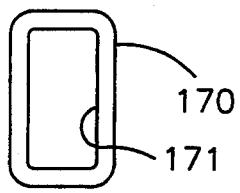
FIG. 4d is a schematic representation of an "O" or "D" shaped lens frame band attachment.
Figure 4E:
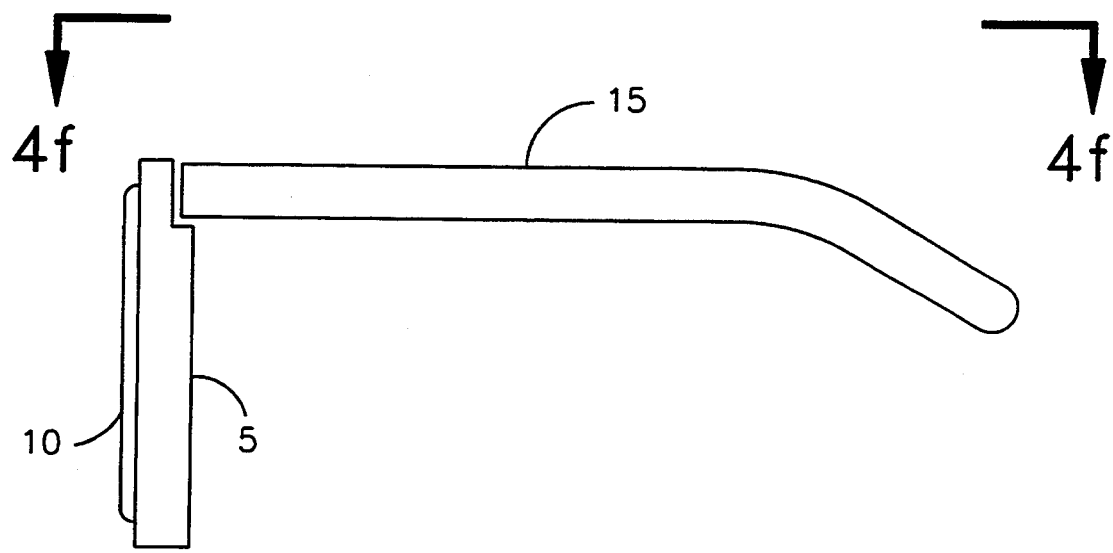
FIG. 4e is side view of a conventional pair of eyeglasses to which the invention has been applied.
Figure 4F:
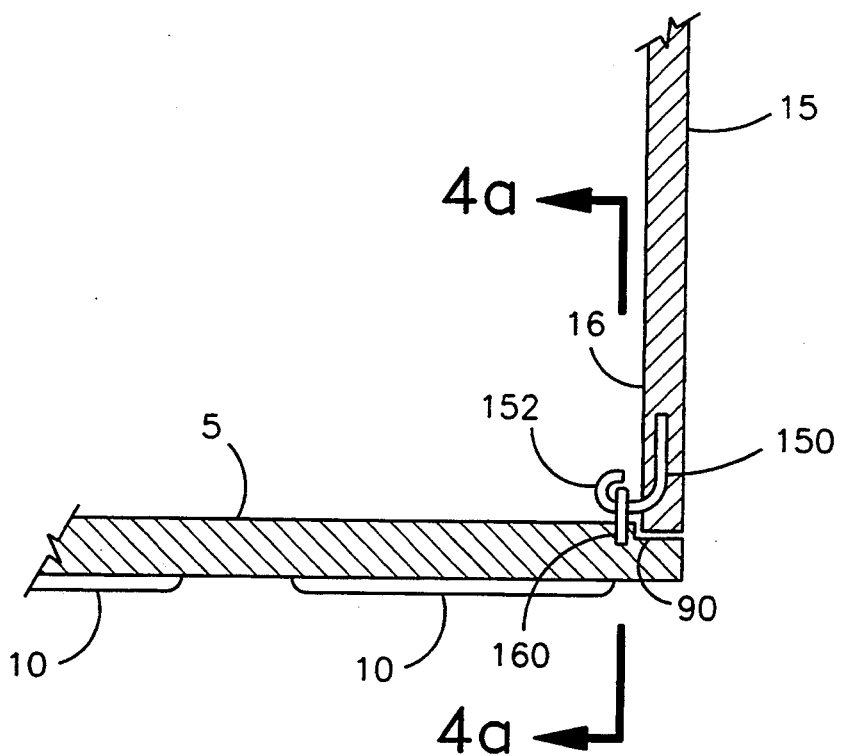
FIG. 4f is a partial cross sectional top view along lines 4f—4f illustrating a second embodiment of the invention adapted to a spring band material.

A third preferred embodiment is illustrated in FIGS. 4a through 4f. Embedded in the temple member at the forward end 19 of the temple member 15 is a first band hinge that is "j" shaped 150 as illustrated in FIG. 4b. The latching portion 152 of the first band hinge exits the temple member 15 through the interior surface of the temple member 15. Embedded in the lens frame 5 is a second band hinge that is "U" shaped band 160 that is illustrated in FIG. 4c. The shape of the "U" shaped band hinge 160 can also be an "O" or "D" shape illustrated in FIG. 4d. It will be apparent to one skilled in the art of eyeglass hinges that the "U" shaped band hinge can be embedded in the lens frame 5 or the temple member 15, and the "j" shaped band hinge 160 can be embedded in the opposite member. The first band hinge 150 and the second band hinge 160 are constructed of a material having flexibility that will exert a force to return to its original position if elastically deformed. The interior surface 151 of the first band hinge 150 is placed against the inner surface 161 of the second band hinge 160. When the temple member 15 is moved relative to the lens frame 5 the spring action of the first band hinge 150 and the second band hinge 160 as illustrated in FIG. 4a will cause a force to act upon the temple member 15 toward the opposite temple member 15 which will force the eyeglasses 1 to be held to the head of the wearer. The spring like action of the hinge device 20 so constructed allows for a high degree of freedom of movement of the temple member with respect to the lens frame.

Figure 5A:
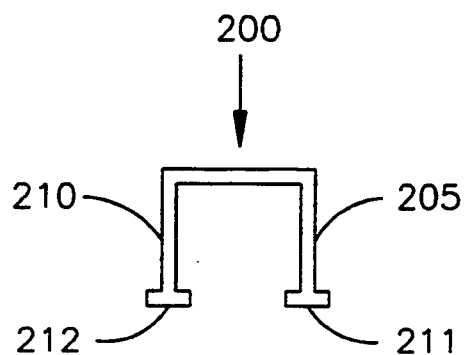
FIG. 5a is a schematic representation of a horseshoe shaped band.
Figure 5B:
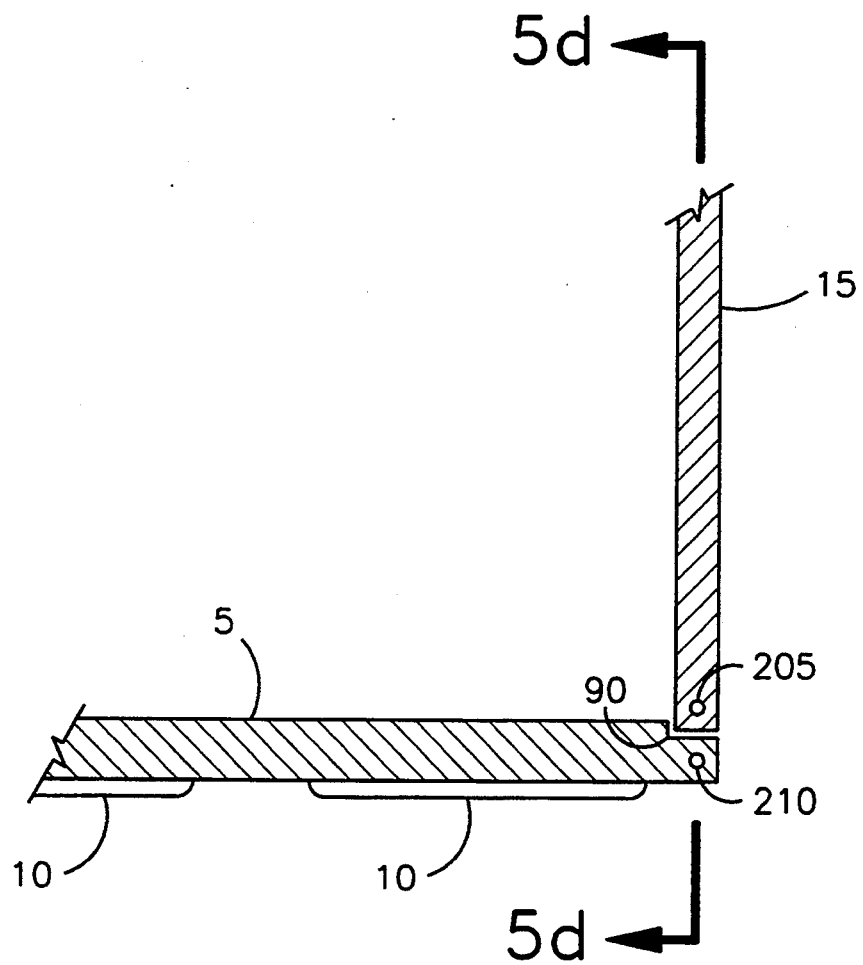
FIG. 5b is a partial cross sectional view along lines 5b—5b illustrating the horseshoe shaped band fitted into a conventional pair of eyeglasses.
Figure 5C:
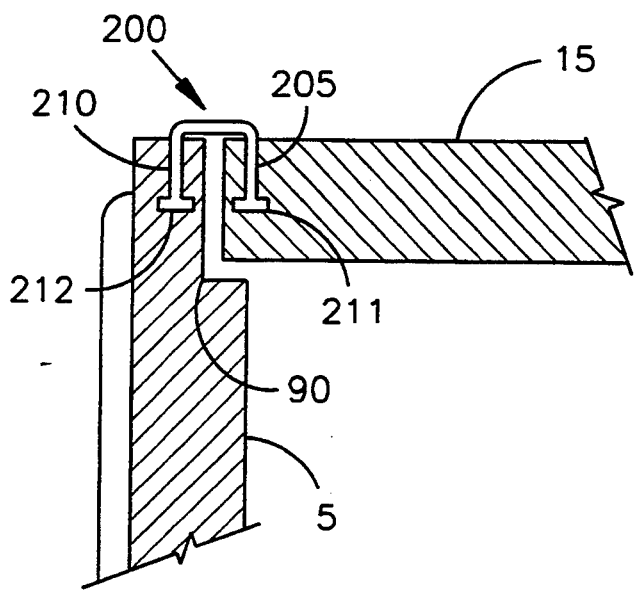
FIG. 5c is an expanded view of a portion of FIG. 5b.
Figure 5D:
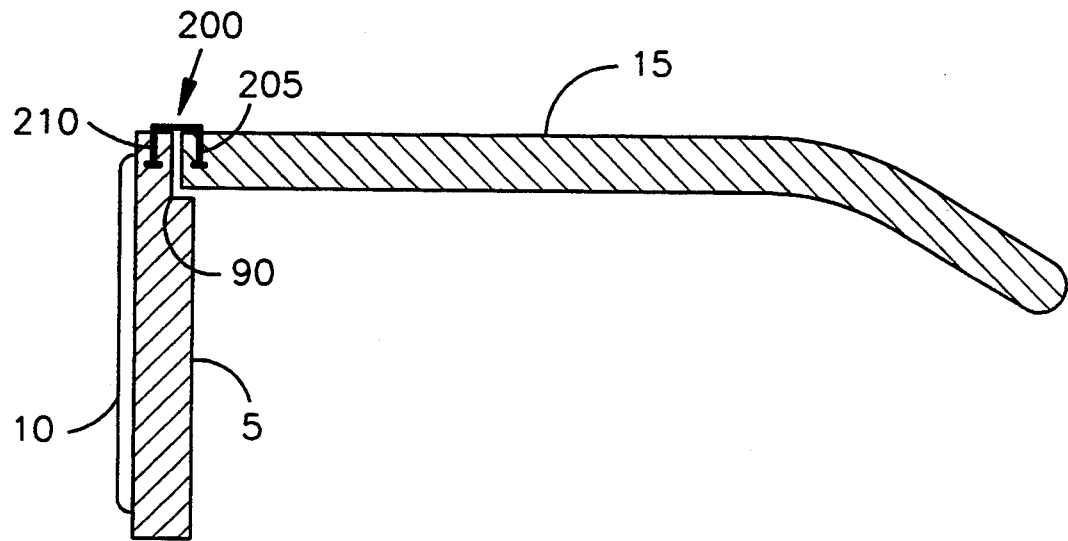
FIG. 5d is a cross sectional side view of a horseshoe shaped band along lines 5d—5d.

A fourth preferred embodiment is illustrated in FIGS. 5a through 5d. A side cross sectional view of a conventional pair of eyeglasses 1 fitted with a horseshoe shaped band 200 as illustrated in FIG. 5d. Embedded in the temple member 15 is a first end 205 of the horseshoe shaped band 200 and embedded in the lens frame 5 is the second end 210 of the horseshoe shaped band 200, as illustrated if FIG. 5b. The embedding of the horseshoe shaped band simultaneously can be accomplished with several available technologies. A key feature of the horseshoe shaped band 200 is the flat end portions 211 and 212 which act as an anchor of the horseshoe shaped band 200 in the material of construction used for the lens frame 5 and the temple member 15.

Several advantages of the invention are inherent over the prior art. The band hinge 20, in all the embodiments allows for movement of the temple piece 15 in several directions without damage to the band hinge 20, lens frame 5, or temple member 15. The action of the hinge also causes the temple member 15 to be forced inward toward the head of the wearer.

While several preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. Eyeglasses with a means to flexibly attach a lens frame to temple members comprising:
   a pair of temple members having an attaching end and a free end extending transversely from said attaching end;
   a pair of hinges connecting the attaching ends to the lens frame, said hinges comprising:
   a first conventional hinge device having a first hinge pin bracket that is affixed to the lens frame, said first hinge pin bracket defining an aperture;
   said temple member having at least two guide holes;
   a band having a first end and a second end;
   wherein said band is threaded through said guide holes and through the aperture;
   wherein the first end is tied to the second end.

* * * * *

UNITED STATES PATENT AND TRADEMARK OFFICE
CERTIFICATE OF CORRECTION

PATENT NO. : 5,410,374
DATED : April 25, 1995
INVENTOR(S) : Harry D. Smith

It is certified that error appears in the above-indentified patent and that said Letters Patent is hereby corrected as shown below:

In column 3, line 2, after the word "and ", please insert --2c.--.

In column 3, line 63, after the word "member ", please insert --15--.

In column 3, line 66, after the word "hinge", please insert --150--.

In column 3, line 67, after the word "surface", please insert --16--.

In column 4, line 6, after the word "hinge", please insert --160--.

Signed and Sealed this

Second Day of December, 1997

Attest:

BRUCE LEHMAN

Attesting Officer

Commissioner of Patents and Trademarks